Aug. 27, 1968  J. A. CORL  3,399,281
ELECTRIFICATION SYSTEM INCLUDING A COMPOSITE CONDUCTOR
Filed Feb. 4, 1966  4 Sheets-Sheet 1

INVENTOR.
JAMES A. CORL

BY FOWLER, KNOBBE
& GAMBRELL
ATTORNEYS.

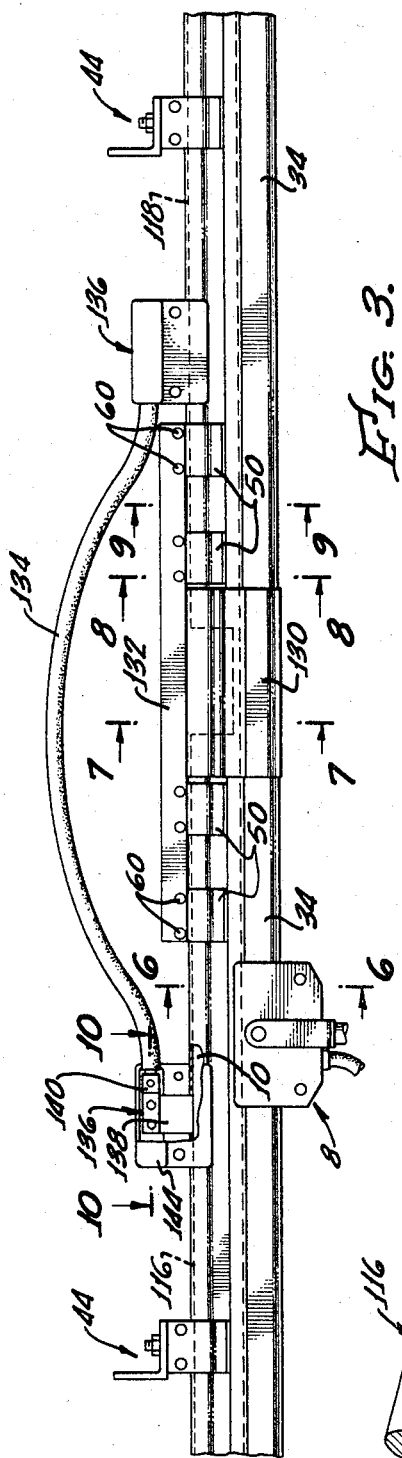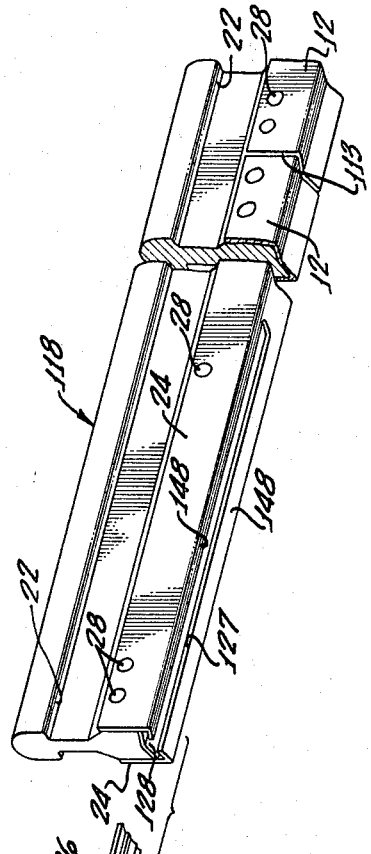

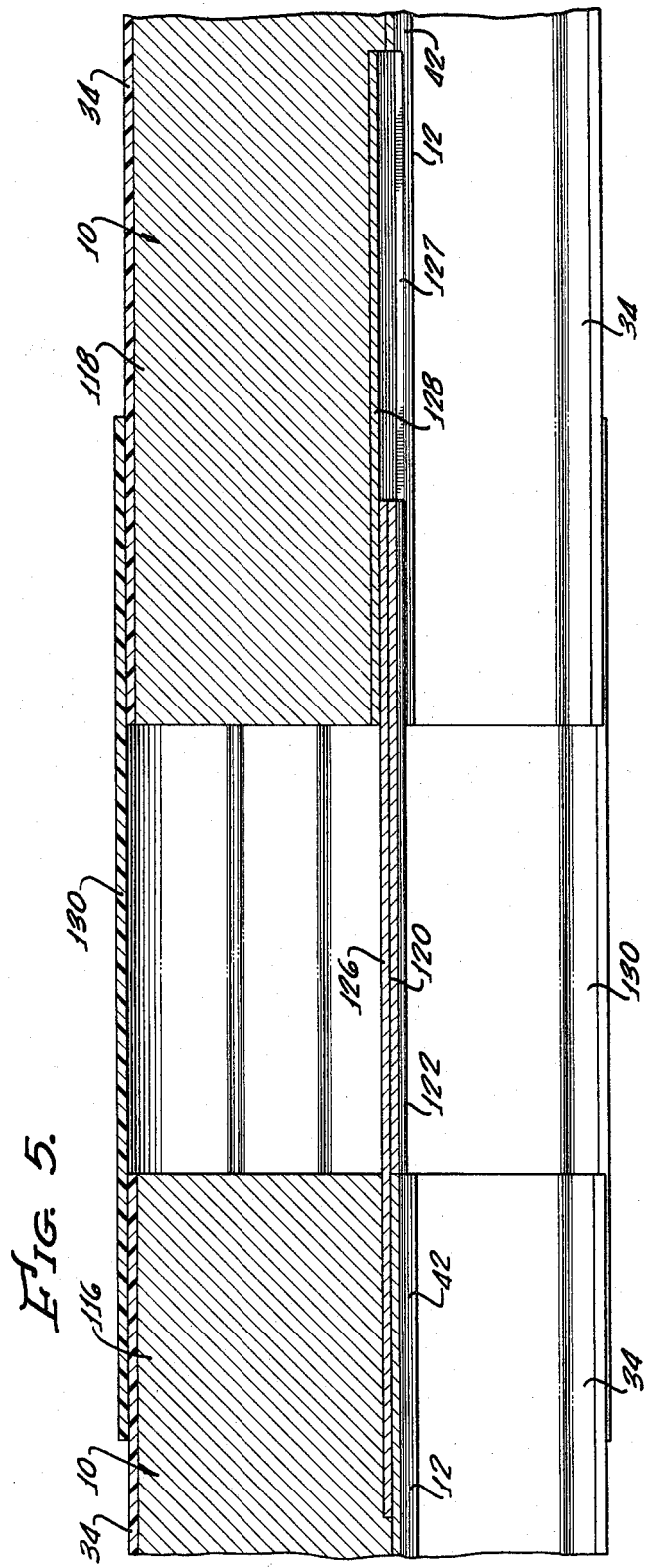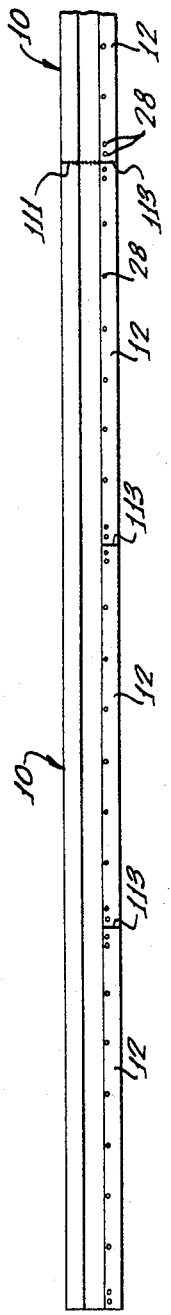

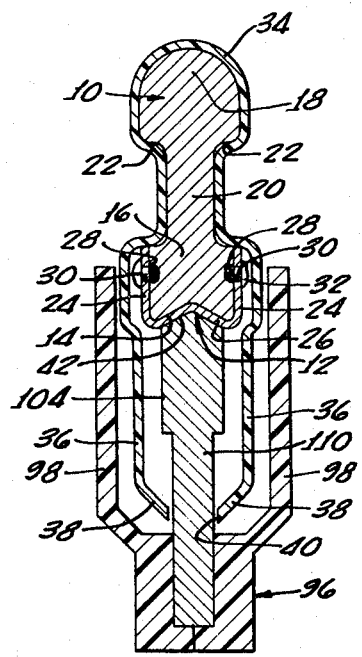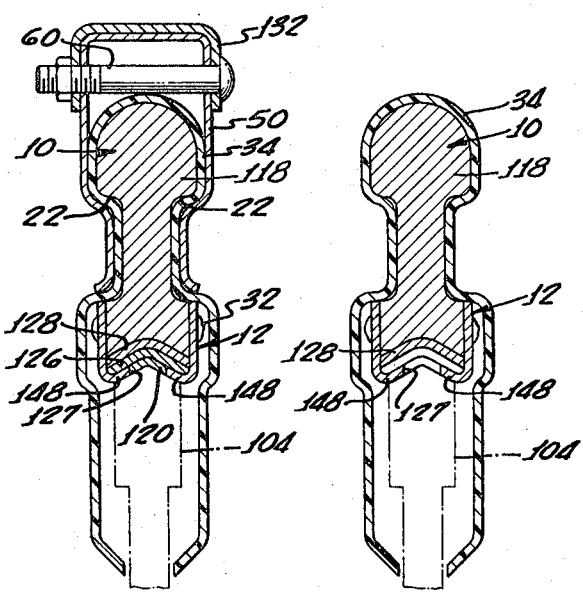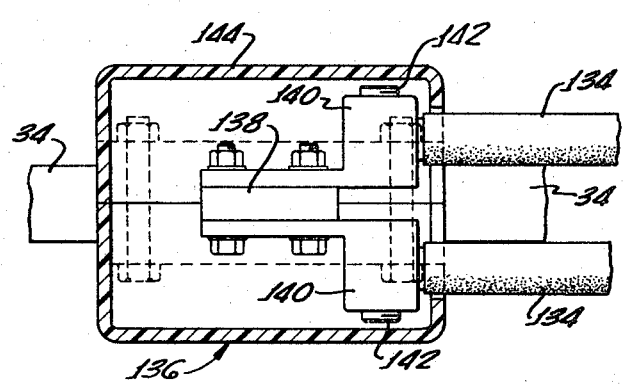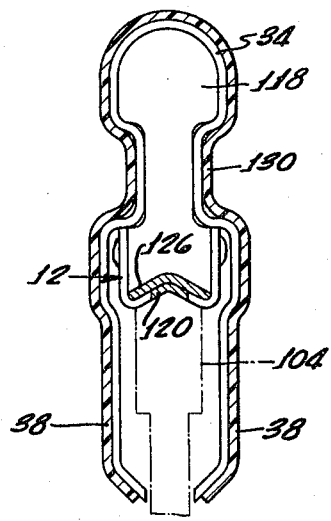

United States Patent Office 3,399,281
Patented Aug. 27, 1968

3,399,281
ELECTRIFICATION SYSTEM INCLUDING A COMPOSITE CONDUCTOR
James A. Corl, San Carlos, Calif., assignor, by mesne assignments, to The Rucker Manufacturing Company, Oakland, Calif., a corporation of California
Filed Feb. 4, 1966, Ser. No. 525,182
8 Claims. (Cl. 191—23)

ABSTRACT OF THE DISCLOSURE

A composite electrical conductor for sliding contact by a current collector includes an aluminum bar of relatively large cross-sectional area and a thin stainless steel cap of W-shaped cross-sectional configuration forming a contact surface. The steel cap is mechanically and electrically connected to the aluminum bar by gas metal-arc spot welds extending through pre-punched apertures in the legs of the cap and fused to the sides of the aluminum bar. The cap is formed in a plurality of shorter lengths connected in slightly spaced end-to-end relationship on a longer bar. An expansion joint between adjacent bars includes a stainless steel tongue extending from the cap of one bar into a mating groove in the cap of the adjacent bar. The expansion joint is arranged to provide a continuous self-centering contact surface for a collector moving across it.

---

This invention relates to electrical conductor systems, and, more particularly, relates to such systems in which a current collector slideably contacts an electrical conductor.

Mobile, or sliding contact, electrification systems are used extensively in industry to provide electrical power to mobile apparatus such as bridge cranes, trolley cars, etc. Generally, such systems include several conductors extending along the path of the mobile apparatus, and a corresponding number of current collectors mounted to move with the apparatus. Each conductor has an exposed face which is slideably contacted by a collector to supply power to the machinery.

Since the path of a crane or trolley car may be hundreds of feet long, each conductor conventionally comprises a plurality of conductor bars connected end-to-end in longitudinal alignment. Heavy duty conductor bars are generally twenty to forty feet in length in order to reduce the number of costly connections without making the bars too long for convenient handling. Usually, the conductor bars are suspended by a series of spaced fixed overhead supports which allow for movement of the conductor bars due to thermal expansion and contraction. One or more expansion joints normally are provided.

In addition to a low electrical resistance, a satisfactory conductor bar for such sliding contact systems must have a face which makes a good electrical contact surface and which will stand up under the constant wear of sliding contact. High structural strength, low weight and low cost also are desirable. Further, the conductor bar should lend itself to facilitate joints between successive bars, particularly expansion joints which ideally should provide a continuous contact surface and one which guides the collector contact shoe as the collector passes over the expansion joint.

Aluminum conductor bars have a relatively good combination of high structural strength, low electrical resistance, low weight, and low cost in comparison with conductor bars of other metals, and are especially suitable for heavy duty installations such as steel mills and shipyard gantrys where the conductors often must be large enough to carry currents on the order of 500–1000 amperes or more. However, aluminum has severe disadvantages in a sliding contact system because aluminum oxide, which forms on its surface, is a very poor electrical conductor. Moreover, aluminum is soft and has a relatively high coefficient of friction, hence affords a poor surface for sliding contact.

The present invention provides a composite conductor bar designed to combine the structural and conductive properties of aluminum with the contact surface properties of stainless steel. Stainless steel is particularly suitable because it not only provides a hard, low friction contact surface with satisfactory surface conductance, it further avoids any problems of corrosion build up which would tend to separate the composite construction.

In general, in accordance with this invention, a composite conductor bar comprises an elongate metal cap of W-shaped cross sectional configuration disposed along one face of an elongate aluminum bar with the top of the W toward the bar and the outer legs of the W connected to opposite side faces of the bar. This particular configuration of the composite conductor bar provides an economical construction which is rugged enough to withstand years of use and which facilitates expansion joints as well as centers and guides the collector as it moves rapidly along the conductor or across an expansion joint.

An expansion joint constructed in accordance with this invention includes two such composite conductor bars supported in longitudinally aligned relationship with ends spaced-apart. A metal tongue affixed to one W-shaped cap is inserted into a mating groove in the other W-shaped cap in telescoping relationship. As the shoe passes the expansion joint, it is in continuous electrical contact with either a cap, the tongue, or the portion of the cap defining the groove, all of which have aligned concave contact surfaces to center the shoe since they are continuous with portions of the inverted V forming the center of the W-shaped caps.

In composite bars having a stainless steel cap fixed to an aluminum bar, differential thermal expansion and contraction between the steel and aluminum causes buckling of the cap and shearing of the connection between the cap and bar in relatively long bars, e.g. over twenty feet in length. Another feature of this invention provides a composite construction which overcomes these problems while permitting the use of relatively long composite bars.

In accordance with this aspect of this invention, the aluminum bar is relatively long and of relatively large cross sectional area, while the stainless steel cap is a plurality of shorter sheets disposed in end-to-end spaced relationship along the bar. Each sheet is electrically and mechanically connected to the bar by a plurality of longitudinally spaced-apart welds fused to the aluminum bar and extending through the sheet. It has been observed in use that this construction with a plurality of spaced shorter caps rather than a single long cap, withstands considerably greater temperature extremes without separating the composite construction.

These and other features and objects of this invention will be apparent from the following detailed description when read with reference to the accompanying drawings, in which:

FIG. 3 is an enlarged elevation view of the expansion joint portion of the conductor assembly illustrated in FIG. 2, with the support beam and portions of collector removed and a portion of the power feed cover cut away for clarity;

FIG. 4 is a partial perspective view of two composite conductor bars constructed in accordance with this invention, illustrating the tongue and groove arrangement of the expansion joint;

FIG. 5 is a longitudinal section through the expansion joint illustrating the structure of the tongue and groove arrangement;

FIG. 6 is a vertical cross section through the collector head assembly and conductor asembly taken generally along lines 6—6 of FIG. 3;

FIG. 7 is a vertical cross section through the expansion joint taken generally along lines 7—7 of FIG. 3 with the collector shoe shown in phantom and the guide assembly removed;

FIG. 8 is a vertical cross section through the expansion taken generally along lines 8—8 of FIG. 3 with the collector shoe shown in phantom;

FIG. 9 is a vertical cross section through the expansion joint taken generally along lines 9—9 of FIG. 3 with the collector shoe shown in phantom and the guide assembly removed;

FIG. 10 is a horizontal section through the jumper feed cover taken generally along lines 10—10 of FIG. 3 illustrating the jumper connections; and, FIG. 11 is an elevation view of a pair of composite conductors with the insulating cover removed, particularly showing the plurality of relatively short caps on each bar.

Figure 1:
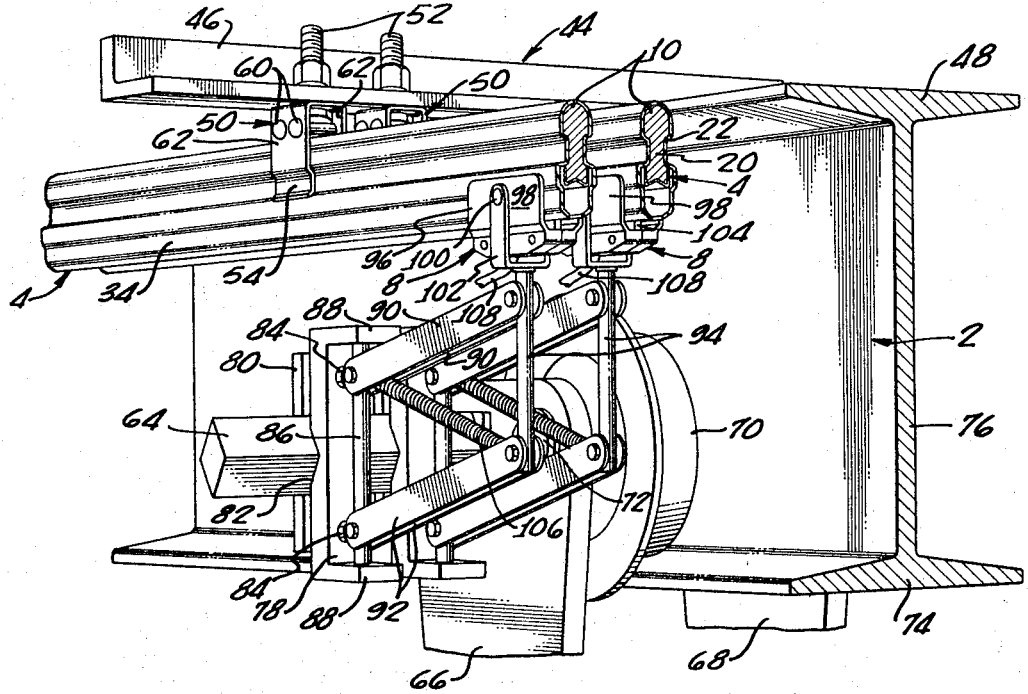
FIG. 1 is a partial perspective view of a sliding contact electrification system constructed in accordance with this invention.
Figure 2:
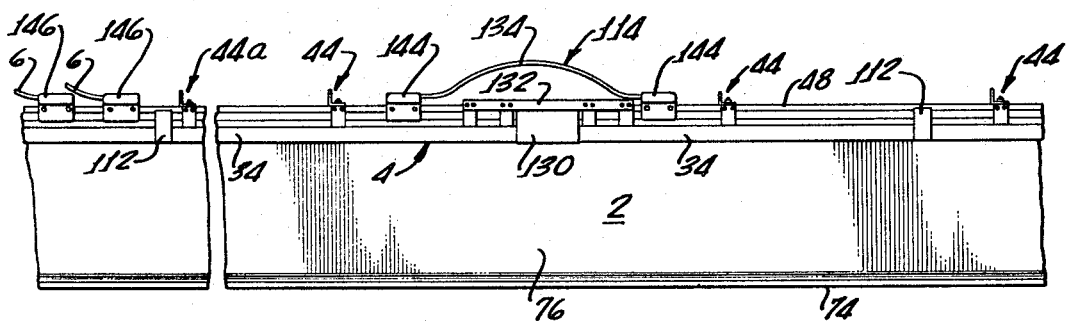
FIG. 2 is an elevation view of the system illustrated in FIG. 1 with portions of the length of the conductor assembly and support assembly removed.

Referring to FIGS. 1 and 2, a sliding contact electrification system constructed in accordance with this invention is illustrated in an exemplary installation wherein an elevated structural support beam 2 extends along the path of a crane or other mobile machinery (not shown). A pair of conductor assemblies 4 which extend side-by-side along the support beam receive current through power supply cables 6. The current is tapped from the conductor assembly by a pair of collectors 8 which travel with the crane or other mobile apparatus.

Referring particularly to FIG. 6, as well as to FIG. 1, the electrical conductor is a composite construction of an elongate metal conductor bar 10 with an elongate metal cap 12 disposed along its front face 14. Preferably, the bar is composed of aluminum or an aluminum alloy and the cap is composed of stainless steel. The conductor bar has a lower portion 16 and a rounded upper portion 18 joined by a relatively narrow neck portion 20 with a downwardly facing shoulder 22 on each side at the transition from the neck to the upper portion. The lower portion is generally square in cross section except that the front face is of concave inverted V-shaped cross sectional configuration.

The stainless steel cap 12 is of W-shaped cross section configuration having the outer legs 24 of the W engaging the opposite side faces of the bar lower portion 16, and the top side of the intermediate inverted V-shaped portion 26 of the W in tight surface-to-surface contact with the front face 14 of the bar. The bar may, for example, be extruded while the cap may be roll formed from a flat stainless steel plate. Preferably, a plate no thicker than about 1/16" is used, with 1/32" thickness having been found most suitable. The cap preferably is overbent approximately three degrees on each leg 24 to assure a tight fit when it is placed on the bar.

The cap is connected to the bar by a plurality of spot welds 28 fused to the sides of the aluminum bar to provide a non-oxidizing contact between the welds and the aluminum. The welding may be done by gas metal-arc spot welding which differs from straight arc welding primarily in that the welder emits an inert gas shield around the weld as it is being made. A more complete description of this welding process is included in an article, "Gas Metal-Arc Spot Welding Joins Aluminum to Other Metals," published in Welding Journal, April 1963. This method of welding produces a spot weld which is not fused to the stainless steel cap 12, but extends through and engages the walls of a pre-punched aperture 30 to provide a tight mechanical fit. The weld has an enlarged head or weld button 32 at the other end to hold the cap in place.

The apertures 30 are preferably about 5/16" in diameter and the button 32 is about 9/16" in diameter. The spacing of the welds is determined by the amperage rating of the conductor in order to obtain sufficient electrical transfer from the conductor bar to the cap, as well as by the structural requirements of fixing the cap on the bar. As shown most clearly in FIG. 4, it has been found satisfactory to use two spot welds 28 on each side of the conductor bar within a few inches of each end, and then to space the welds on each side at approximately fifteen inches between the ends. However, it is preferable to shorten the spacing between the second and third welds on one side so that the intermediate welds on opposite sides of the bar are staggered (see FIG. 4).

Still referring to FIG. 6, an elongate insulated cover 34 fits tightly around the upper 18 and neck 20 portions of the bar, but is spaced laterally from the legs 24 of the cap to allow for the weld buttons 32. The sides 36 of the cover 34 extend forward of the cap to form protective skirts. The lower edge portions 38 of the skirts converge, but terminate in laterally spaced relationship to define an elongate slot 40 through which the bottom or contact surface 42 of the W-shaped cap is exposed.

Referring again to FIGS. 1 and 2, the conductor assemblies 4 are suspended from the support beam 2 by a plurality of hanger assemblies 44 spaced along the length of the conductors, e.g. at approximately ten feet on center. Each hanger assembly includes an angle support arm 46 which is welded to the upper flange 48 of the support beam and extends laterally over the conductor assembly. Two U-shaped hanger clamps 50 are each suspended from the lower side of the hanger support arm by a bolt 52. The clamps 50 have opposite inwardly extending lips 54 at the extremity of their legs which grip the opposite sides of the insulated cover around the neck 20 of the bar to support the conductor by the outwardly extending shoulder 22. A pair of clamping bolts 60 which extend through both legs 62 of each clamp are tightened to retain the conductor assembly in the hanger clamp.

The collectors 8 are guided by flanged wheels 70 which roll on the lower flange 74 of the support beam on opposite sides of the web 76. The wheels rotate on axles 72 mounted on structural arms 66, 68 which are fixed to the mobile apparatus.

A square mounting bar 64 extends from one structural arm 66 under the conductor assemblies. Each collector is connected to the mounting bar 64 by front 78 and rear 80 mounting brackets which include recessed portions 82 conforming to the square mounting bar 64. The brackets are clamped around the mounting bar by bolts 84.

A vertical mounting rod 86 is rotatably connected between the legs 88 of the U-shaped front mounting bracket 78. A pair of elongate arms 90 are pivotally pinned to the upper portion of the mounting rod 86 and another pair 92 are pivotally pinned to the lower portion of the mounting rod. The distal ends of the arms are similarly connected to a vertical head support rod 94 to form a parallel arm arrangement.

Referring particularly to FIGS. 1 and 6, a head assembly 96 is formed in two halves which are bolted together around a metal shoe 104 extending through the longitudinal slot 40 in the bottom of the conductor insulated cover to slideably contact the metal conductor cap 12. The head includes an insulated shield 98 on opposite sides of each conductor assembly. Pins 100 mount the head in a cradle 102 for limited pivotal movement about a horizontal axis, and the cradle is rotatably mounted at the upper end of the vertical support rod 94. A spring 106 extending diagonally from the upper end of the mounting rod 86 to the lower end of the head support rod 94 continuously biases the head upward into firm contact with the conductor cap. Current is fed from the metal shoe to the mobile apparatus through the leads 108.

The upper surface of the metal shoe 104 is of convex inverted V-shaped cross sectional configuration conforming to the bottom side 42 of the W-shaped cap. The neck portion 110 of the collector shoe is of reduced width so as to pass freely between the skirts 36 of the conductor insulated cover as the collector assembly moves along the conductor assembly.

The insulated covers 34, as well as the other insulated members, are preferably constructed of a semi-rigid material such as polyvinylchloride or fiber glass reinforced polyester. Thus, the skirts can be spread to insert and remove the shoes.

For convenience in shipment and installation, the conductor assembly generally is made up of a plurality of sections which are connected in longitudinal alignment on the job site by welds 111 (see FIG. 11). However, in order to reduce the number of welded connections, bars of about twenty to forty feet long are preferred. As the ends of each section of the conductor bar are exposed for convenience in splicing, a short insulated splice cover 112 (see FIG. 2) generally similar in shape to the insulated bar cover but slightly larger in dimensions, is placed over each completed splice. The splice cover overlaps the insulated bar covers to provide continuous insulation.

Referring particularly to FIGS. 4 and 11, the conductor cap 12 is made in a plurality of shorter pieces which are fixed to the elongate bar 10 in end-to-end relationship. Preferably, each of the caps is about eight to twelve feet long. For example, in order to use modular units, bars of twenty, thirty or forty foot length can be used with caps ten feet long. It has been found that caps of the thickness discussed above will not shear the welds 28 in this length in the temperature ranges which the bar encounters in use. The ends of the caps are adjacent each other with a very small gap 113 of about 1/16" and not more than 1/8" between them.

Referring again to FIG. 2, as the conductor assembly is often hundreds of feet long, expansion joints 114 are provided periodically along its length to accommodate the differential expansion between the conductor assembly and the support beam 2. The clamping bolts 60 of one hanger clamp, e.g. on bracket 44a approximately midway between each pair of expansion joints are drawn up tight to immovably fit that hanger clamp to the conductor assembly. The remaining hanger clamps are made only sliding tight so that the conductor assembly may expand and contract longitudinally relative to the support beam.

Referring now particularly to FIGS. 3, 4 and 5, the expansion joint section includes a male conductor member 116 and a female conductor member 118 interconnected in telescoping relationship. The male member has an elongate metal tongue 120 extending from its cap 12 beyond the end of the conductor bar. The tongue is narrower than the cap, and is an extension of the central apex portion 124 of the W. Being of the same concave inverted V-shaped cross sectional configuration, its lower surface 122 is in alignment with the bottom or contact surface 42 of the cap. An elongate back-up spline 126 of the same cross sectional configuration as the tongue, but of substantially the same width as the front face 14 of the conductor bar, is fixed to the upper surface of the tongue to stiffen it. A portion at the end of the male conductor bar is removed to receive the back-up spline so that the tongue and back-up spline have a relatively strong cantilever support.

An elongate groove 127 in the adjacent end of the female member 118 is of substantially the same width as the tongue and slightly greater in length so as to slideably receive the tongue. The lower face of the female conductor bar is recessed to receive a back-up plate 128 which is affixed between the opposite legs 24 of the cap in spaced relationship from the intermediate portion of the cap. The plate 128 is of concave inverted V-shaped cross sectional configuration, and together with the cap, defines a mortise for slideably receiving the male back-up spline 126. The tongue 122, back-up spline 126 and plate 128 are preferably made of stainless steel.

The insulating covers 34 of the male and female members terminate at the end of the respective conductor bars. When the bars are longitudinally spaced, the gap between the covers 34 is bridged by an insulated joint cover 130 which is slideably nested over the ends of the two members 116, 118. The joint cover 130 is of substantially the same configuration as the insulated covers 34 of the two members but slightly larger in cross section.

Referring now to FIGS. 3 and 8, a guide means holds the male 116 and female 118 membes of the expansion joint in alignment. The guide includes an elongate channel 132 which bridges the joint above the conductor members, and is connected to the members by a plurality of hanger clamps 50 similar to those supporting the conductor assemblies. Each hanger clamp is inserted interior of the guide channel 132 and fastened to it by a pair of bolts 60 extending through the opposite legs of the guide channel and the opposite sides of the hanger clamp. The bolts on two of the guide hanger clamps are drawn up tight so that the guide is fixed to one of the expansion joint members, while the bolts of the other clamps are drawn only to a sliding fit on the other expansion joint member.

With particular reference to FIGS. 3 and 10, a pair of flexible jumper cables 134 bridge the expansion joint to conduct the greatest portion of the current across it. The jumper cables are in electrical contact with the male and female conductor bar members through a fed connector 136 at each of their ends. The feed connector includes a metal plate 138 which is welded to the top of the conductor bar 10, and extends upward through the insulating cover 34. A pair of lugs 140 bolted to the upper end of the plate 138 receive the jumper cables 134, which are held in place by threaded fasteners 142. An insulated cover 144 which houses each connector is formed of two parts bolted together around the upper portion of the insulated conductor bar to hold the cover in place. The power feed connectors 146 illustrated in FIG. 2 for connecting the power supply to the conductor assembly, are similar to the feed connectors 136 used for jumping the expansion joint.

In operation, the collector shoes 104 are inserted between the skirts 36 so that each shoe is in sliding contact with the cap 12 of a conductor bar 10, as shown most clearly in FIGS. 1 and 6. As the collectors 8 reach the expansion joint 114, e.g. approaching from the left in FIG. 3, the shoe leaves the main cap 12 and comes into contact with the elongate tongue 120 of the male member (see FIG. 7). The concave configuration of the tongue guides the collector shoe and centers it in the same manner as the concave configuration of the main cap. As the collector shoe continues on, it comes into contact with the cap 12 of the female member 118 while remaining in contact with the tongue 124 which is inserted in the groove 127. As shown in FIG. 8, the collector shoe remains centered by the tongue and the portions 148 of the female cap alongside the groove 127. As the collector shoe moves beyond the end of the tongue, it remains in contact with the portions of the female cap alongside the groove and is centered by their concave configuration. Then the collector shoe continues on past the groove to contact the main cap 12 of the female member.

Thus, as the collector travels across the expansion joint, the shoe remains continuously in electrical contact with, and is continuously centered by, either the main cap, the tongue, or the portions of the cap alongside the groove irrespective of longitudinal spacing of the bars. As all these contact surfaces are in alignment, there is no danger of damage to the collector shoe.

While the invention has been described with reference to a particular installation using two conductor assemblies, it is to be understood that in other installations more conductor assemblies may be desired, and it may be desired to use more than one head assembly in tandem contacting a single conductor. These and other modifications of the above-described embodiment are considered within the teaching of this invention which should be limited only in accordane with the following claims.

I claim:
1. In a conductor assembly adapted to be slideably contacted by a current collector, an expansion section comprising:
    (a) first and second longitudinally aligned elongate metal bars each having a front face and opposite side faces;
    (b) first and second elongate metal sheets of W-shaped cross-sectional configuration capping the first and second bar respectively, each cap having an intermediate contact face disposed along the front face of the bar and outer legs disposed along the opposite side faces of the bar;
    (c) means connecting the outer legs of each cap to the side faces of its respective bar;
    (d) a metal tongue affixed to the first cap and having a generally V-shaped contact surface in continuous alignment with the contact face of the cap; and
    (e) a groove defined in one end of the second cap to slideably receive the tongue, the portion of the second cap defining the groove having a generally V-shaped contact surface in continuous alignment with the contact face of the cap.
2. In a conductor assembly adapted to be slideably contacted by a current collector, an expansion section in accordance with claim 1 wherein
    (a) each elongate metal bar is composed primarily of aluminum;
    (b) each metal cap is stainless steel; and
    (c) the means connecting the caps to the bars include a plurality of longitudinally spaced spot welds fused to the opposite side faces of the aluminum bars and extending through apertures in the outer legs of the stainless steel caps.
3. A conductor assembly comprising:
    (a) a plurality of elongate aluminum bars connected in end-to-end relationship, each having opposite side faces and a concave front face of V-shaped cross sectional configuration;
    (b) an elongate stainless steel cap of W-shaped cross sectional configuration disposed along each bar with the outer legs of the W tightly engaging the opposite side faces of the bar lower portion and the upper surface of the intermediate portion in engagement with the front face of the bar, the legs including a plurality of apertures at spaced locations along their length;
    (c) a plurality of spot welds fused to the opposite sides of each aluminum bar and extending through the apertures to fix the caps to the bars;
    (d) an elongate insulated cover housing each bar and cap, the cover having opposite side walls extending forward of the cap and an elongate slot through which the lower intermediate surface of the W-shaped cap is exposed;
    (e) means for supporting the bars from a support structure at spaced locations along the length of the bars, selected ones of the supporting means fixing the bar to the support structure and the remaining supporting means permitting longitudinal movement of the bars relative to the support structure; and
    (f) expansion joint means intermediate two fixed supports including
        an elongate stainless steel tongue extending from the cap of a first bar into an elongate groove defined in the cap of a second bar in telescoping relationship, the tongue and groove being disposed in alignment with the central apex portion of the caps,
        a back-up spline of V-shaped cross sectional configuration fixed to the upper surface of the tongue, the back-up spline being of substantially the same width as the front face of the bars,
        a back-up plate affixed to the grooved cap in spaced parallel relationship to define a mortise for receiving the back-up spline,
        an insulated joint cover nested over the insulated covers of the first and second bars,
        guide means exterior of the insulated covers for aligning the first and second bars, and
        at least one flexible jumper cable in electrical contact with the first and second bars to carry the greatest portion of the current across the expansion joint.
4. A composite electrical conductor bar adapted to be connected in end-to-end relationship with other similar conductors to provide a continuous conductor for sliding contact by a current collector, said composite conductor comprising:
    (a) an elongate aluminum bar of relatively large cross sectional area having a front face and opposite side faces;
    (b) a plurality of shorter stainless steel sheets of relatively small cross sectional area disposed along the bar in end-to-end spaced relationship;
    (c) each of the sheets having a central portion disposed along the front face of the bar and a pair of outer legs disposed along the opposite side faces of the bar, the outer legs having apertures therethrough; and
    (d) a plurality of longitudinally spaced spot welds fused to the opposite faces of the aluminum bar and extending through the apertures in the outer legs of the stainless steel sheets to electrically and mechanically connect the sheets to the bar.
5. A composite electrical conductor bar adapted to be connected in end-to-end relationship with other similar conductors to provide a continuous conductor for sliding contact by a current collector in accordance with claim 4 wherein
    (a) the thickness of the stainless steel sheets is not greater than about $\frac{1}{16}''$; and
    (b) the longitudinal spacing between adjacent sheets is not greater than about $\frac{1}{8}''$.
6. A composite electrical conductor bar adapted to be connected in end-to-end relationship with other similar conductors to provide a continuous conductor for sliding contact by a current collector in accordance with claim 4 wherein the aluminum bar is approximately twenty to forty feet in length and each of the stainless steel sheets is approximately eight to twelve feet in length.
7. A composite electrical conductor adapted to be slideably contacted by a current collector, said composite conductor comprising:
    (a) an elongate aluminum bar having opposite side faces and a front face of concave cross sectional configuration;
    (b) an elongate cap of thin steel having an intermediate concave contact portion disposed along the front face of the bar and mating therewith and a pair of outer legs tightly engaging the opposite side faces of the bar, the legs including a plurality of apertures therethrough at spaced locations along their length; and
    (c) a plurality of spot welds fused to the side faces of the aluminum bar and extending through each aperture for fixing the cap on the bar and providing a low resistance current path from the bar to the cap.
8. A composite electrical conductor in accordance with claim 7 wherein said elongate cap is stainless steel and is of a W-shaped cross-sectional configuration.

(References on following page)

References Cited

UNITED STATES PATENTS

| | | | |
|---|---|---|---|
| 921,245 | 5/1909 | Harrison | 238—231 |
| 2,831,071 | 4/1958 | Taylor | 191—44.1 |
| 3,090,840 | 5/1963 | Dehn | 191—23 |
| 3,222,464 | 12/1965 | Dehn | 238—150 |
| 3,311,715 | 3/1967 | Corl | 191—30 |

FOREIGN PATENTS 70,654    7/1946    Norway.

ARTHUR L. LA POINT, *Primary Examiner.*

D. F. WORTH, *Assistant Examiner.*